US00RE43502E

(19) United States
(12) Reissued Patent
Baxter et al.

(10) Patent Number: US RE43,502 E
(45) Date of Reissued Patent: Jul. 10, 2012

(54) TELECOMMUNICATIONS ENCLOSURE BOX EMPLOYING MOUNTING BRACKETS FOR SUPPORTING COMPONENTS PROVIDING COMMUNICATIVE CONNECTION OF REMOTE MULTIMEDIA EQUIPMENT

(75) Inventors: Robert C. Baxter, Warwick, RI (US); William G. Sobieski, Guilford, CT (US); Dale D. Martin, East Lyme, CT (US); Steven O. Fournier, Southington, CT (US)

(73) Assignee: Hubbell Incorporated, Shelton, CT (US)

(21) Appl. No.: 10/960,902

(22) Filed: Oct. 8, 2004

Related U.S. Patent Documents

Reissue of:
(64) Patent No.: 6,460,951
Issued: Oct. 8, 2002
Appl. No.: 09/467,347
Filed: Dec. 20, 1999

(51) Int. Cl.
*A47B 43/00* (2006.01)

(52) U.S. Cl. ..... 312/257.1; 312/223.6; 312/293.2; 174/50

(58) Field of Classification Search ..... 312/257.1, 312/263, 265.5, 223.1, 223.6; 174/50, 58, 174/62, 17 R; 220/3.2, 4.02, 3.8; 52/220.1, 52/220.2, 220.7, 239; 248/300, 220.1, 220.21, 248/220.22

See application file for complete search history.

(56) References Cited

U.S. PATENT DOCUMENTS

| | | | | |
|---|---|---|---|---|
| 3,199,068 | A * | 8/1965 | Neenan | 174/58 |
| 3,356,432 | A * | 12/1967 | Mariotte et al. | 312/323 |
| 3,403,641 | A | 10/1968 | Baker | |
| 3,675,955 | A | 7/1972 | Hadjuk | |
| 4,246,436 | A | 1/1981 | Hoffman et al. | |
| 5,639,261 | A * | 6/1997 | Rutkowski et al. | 439/534 |
| 5,640,482 | A * | 6/1997 | Barry et al. | 385/136 |
| 5,663,525 | A | 9/1997 | Newman | |
| 5,721,394 | A | 2/1998 | Mulks | |
| 5,933,563 | A | 8/1999 | Schaffer et al. | |
| 6,005,188 | A | 12/1999 | Teichler et al. | |
| 6,095,156 | A | 8/2000 | Smith, II | |
| 6,101,773 | A | 8/2000 | Chau et al. | |
| 6,111,195 | A | 8/2000 | Hand et al. | |
| 6,256,444 | B1 * | 7/2001 | Bechamps et al. | 385/136 |
| 6,424,781 | B1 * | 7/2002 | Puetz et al. | 385/136 |
| 6,543,626 | B1 * | 4/2003 | Mendoza | 211/26 |

FOREIGN PATENT DOCUMENTS

| | | |
|---|---|---|
| EP | 0583883 | 2/1994 |
| FR | 2601546 | 1/1988 |

* cited by examiner

*Primary Examiner* — Hanh V Tran
(74) *Attorney, Agent, or Firm* — Alan I. Cantor; Mark S. Bicks; Alfred N. Goodman

(57) ABSTRACT

A telecommunications enclosure box for compactly supporting and housing components that provide communicative connection of remote multimedia equipment. The enclosure box includes a base, a front door, pairs of first and second mounting brackets, and pluralities of first and second securing elements. The pairs of first mounting brackets and second mounting brackets are adapted to support various components on the base for communicative connection of remote multimedia equipment.

15 Claims, 6 Drawing Sheets

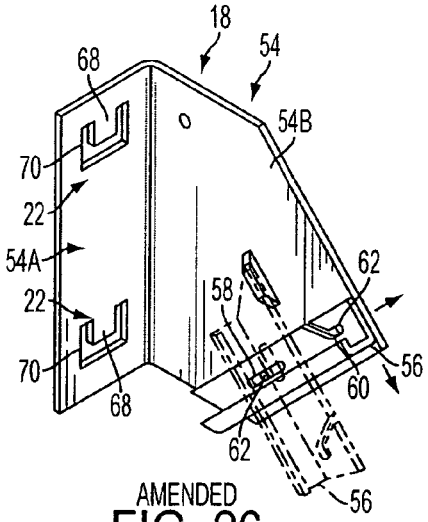
AMENDED
FIG. 26
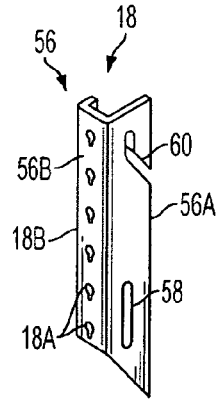
AMENDED
FIG. 30
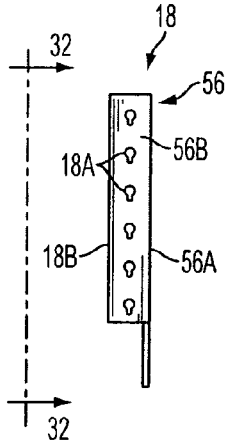
AMENDED
FIG. 31
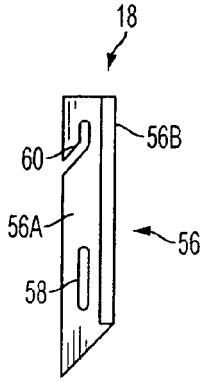
AMENDED
FIG. 32

TELECOMMUNICATIONS ENCLOSURE BOX EMPLOYING MOUNTING BRACKETS FOR SUPPORTING COMPONENTS PROVIDING COMMUNICATIVE CONNECTION OF REMOTE MULTIMEDIA EQUIPMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to telecommunications interconnection and cross connection equipment and, more particularly, is concerned with a telecommunications enclosure box employing mounting brackets for compactly supporting and housing components that provide communicative connection of remote multimedia equipment.

2. Description of the Prior Art

The organization and management of voice and data telecommunications networks in building and office environments involves the provision of connection assemblies in or near work areas. These connection assemblies establish connection points for both horizontal and vertical runs of cables with one another or with patch cords providing routing to work stations. These connection assemblies further facilitate terminations between the horizontal cables and patch cords which remain undisturbed when the patch cords leading to the work stations have to be reconfigured to make changes in work station arrangements.

There are many different connection assemblies manufactured and sold by Hubbell Premise Wiring, Inc., a subsidiary of Hubbell Incorporated, of Stonington, Conn., which address the demands of diverse cross connection and interconnection schemes. These connection assemblies have performed well and have achieved general acceptance among users in the commercial marketplace. However, as with all products, the need arises from time to time for further innovations which will enhance performance and address additional demands, such as, for more concentrated telecommunication in decentralized applications involving diverse institutions and establishments, for instance, schools, hospitals, warehouses and retail enterprises.

SUMMARY OF THE INVENTION

The present invention relates to a telecommunications enclosure box designed to satisfy the aforementioned need by employing mounting brackets for compactly supporting and housing various components that provide communicative connection of remote multimedia equipment. The enclosure box provides a more simplified and efficient support of the various communicative connection components by using a plurality of pairs of mounting brackets which are mounted in the enclosure box so as to enable support of the various components in different configurations. Also, one of the pairs of mounting brackets provides a positive displacement stop and allows pivotal movement of a connection component to a temporary work position that accommodates and facilitates the carrying out final installation terminations.

Accordingly, the present invention is directed to a telecommunications enclosure box for compactly supporting and housing components that provide communicative connection of remote multimedia equipment. The enclosure box comprises: (a) a base including a back wall and a side wall connected to and surrounding the back wall so as to form an interior cavity therewith, the side wall also forming a peripheral edge defining a front opening to the interior cavity; (b) a front door mounted to the side wall of the base to undergo movement toward and away from the back wall of the base for opening and closing the front opening to the interior cavity of the base to thereby respectively expose and enclose the interior cavity of the base; (c) a pair of first mounting brackets and a pair of second mounting brackets, each pair having means for attaching with and thereby supporting the various components for communicative connection of remote multimedia equipment, the first mounting brackets being attached to the base; and (d) a plurality of first securing elements and a plurality of second securing elements, each of the first securing elements being complementary in configuration to a respective one of the second securing elements for matable interfitting of the first securing element with the second securing element, the first securing elements being formed on one of the back wall of the base and the second mounting brackets, the second securing elements being formed on the other of the back wall of the base and the second mounting brackets and matably interfitted with the respective first securing elements to mount the second mounting brackets on the back wall of the base.

More particularly, each of the first securing elements includes a loop having a rigid construction and protruding outwardly from one of the second mounting bracket and the back wall of the base and a slot defined adjacent to the loop. Each of the second securing elements includes a tongue having a rigid construction and formed on the other of the second mounting bracket and the back wall of the base by a generally U-shaped slot defined therein. The tongue matably interfits through the slot adjacent to the loop.

The first mounting brackets are substantially mirror images of one another. In a first embodiment of the enclosure box where the front door has a first depth size, each of the first mounting brackets includes only a first inner bracket member fixedly attached to the base. In a second embodiment of the enclosure box where the front door has a second depth size larger than the first depth size, each of the first mounting brackets includes both the first inner bracket member and a first outer bracket member. The first inner bracket member is fixedly attached to the back wall of the base and the first outer bracket member is mounted to the first inner bracket member. The rigid loop of the first securing element is formed on one of the first inner bracket member and first outer bracket member. The rigid tongue of the second securing element is formed on the other of the first inner bracket member and first outer bracket member and aligns and matably interfitted with the respective rigid loop of the first securing element to mount the first outer bracket member to the first inner bracket member.

Further, the second mounting brackets are substantially mirror images of one another. Each second mounting bracket includes a second inner bracket member mounted to the back wall of the base and a second outer bracket member mounted to the second inner bracket member so as to permit the second outer bracket member to undergo pivotal movement relative to the second inner bracket member. Each second mounting bracket has formed thereon either one of a pair of spaced apart first securing elements and a pair of spaced apart second securing elements. The back wall of the base has the other of the pair of spaced apart first securing elements and the pair of spaced apart second securing elements formed thereon and being aligned and interfitted with the one of the pair of spaced apart first securing elements and the pair of spaced apart second securing elements so as to mount the second mounting brackets on the back wall of the base. Also, the back wall of the base has a pair of spaced apart tabs cut and bend out therefrom so as to lie along and support the respective second inner bracket members of the second mounting brackets.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 26 is a front perspective view of a right one of a pair of second inner bracket members of the second mounting brackets mounted on the base of the enclosure box in FIGS. 1, 8, 9, 12 and 13.

FIG. 30 is a front perspective view of a right one of a pair of second outer bracket members of the second mounting brackets which is mounted on the second inner bracket members of the second mounting brackets on the base of the enclosure box in FIGS. 1, 8, 9, 12 and 13.

FIG. 31 is a front elevational view of the second outer bracket member of FIG. 30.

FIG. 32 is a side elevational view of the second outer bracket member as seen along line 32-32 of FIG. 31.

DETAILED DESCRIPTION OF THE INVENTION

Figure 1:
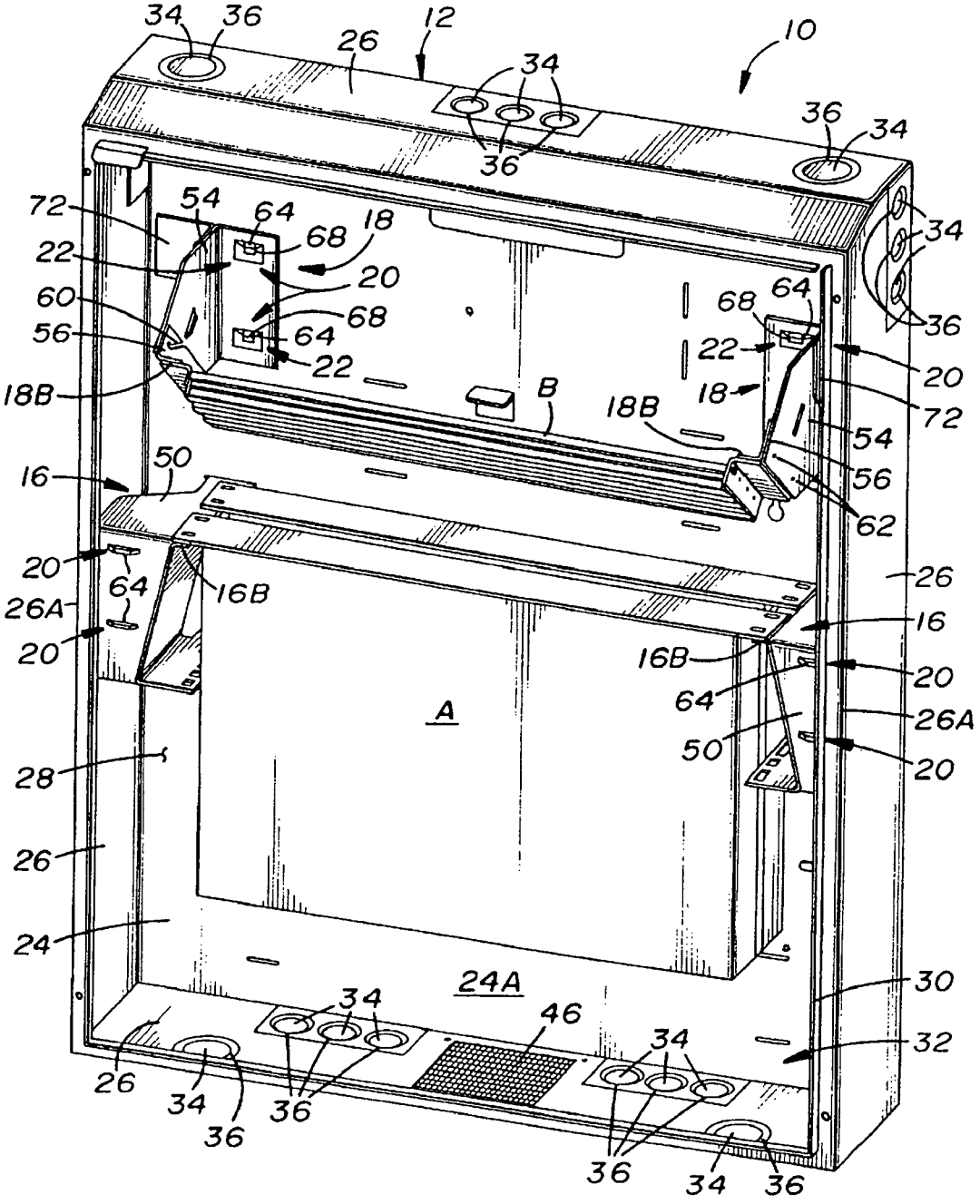
FIG. 1 is a perspective view of a telecommunications enclosure box of the present invention with a front door removed from a base of the enclosure box to show several communicative connection components supported by pairs of mounting brackets mounted on a back wall of the base of the enclosure box.

In the following description, like reference characters designate like or corresponding parts throughout the several views of the drawings. Also in the following description, it is to be understood that such terms as “forward”, “rearward”, “top”, “bottom”, “upwardly”, “downwardly”, and the like are words of convenience and are not to be construed as limiting terms.

Figure 1A:
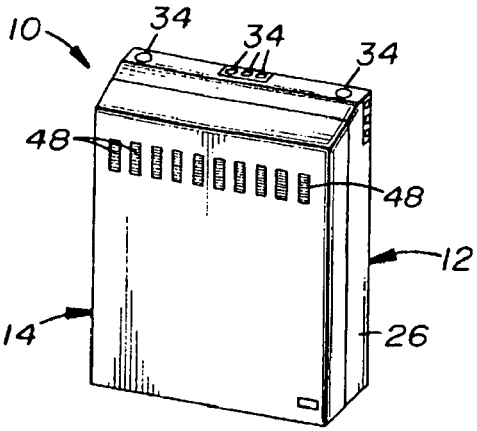
FIG. 1A is a front perspective view of the enclosure box of FIG. 1 with the front door installed on the base of the enclosure box.
Figure 4:
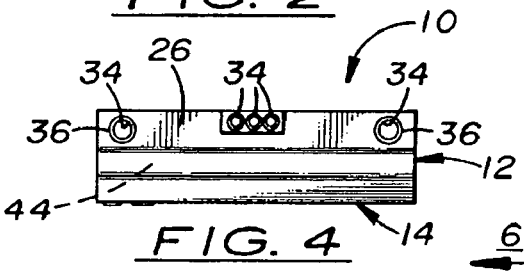
FIG. 4 is a top plan view of the enclosure box as seen along line 4-4 of FIG. 3.
Figure 3:
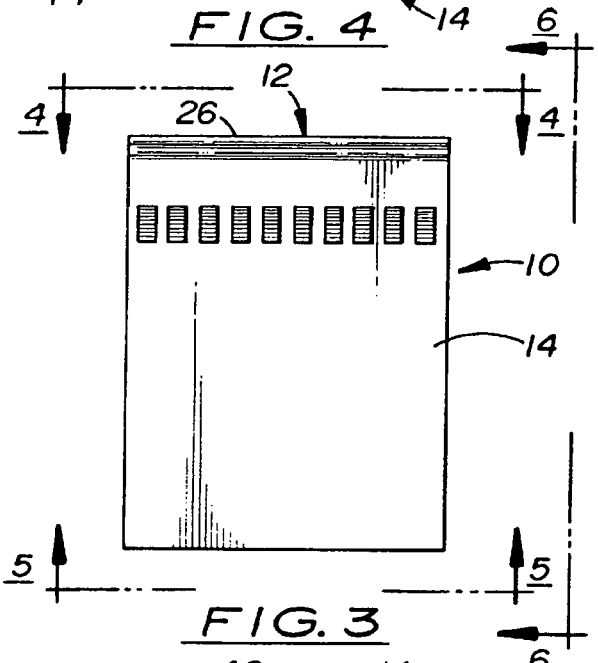
FIG. 3 is a front elevational view of the enclosure box of FIG. 1A.
Figure 5:
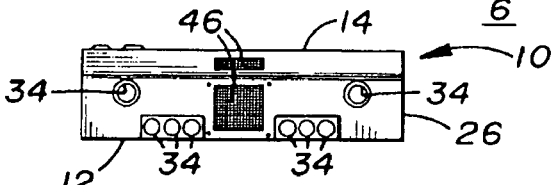
FIG. 5 is a bottom plan view of the enclosure box as seen along line 5-5 of FIG. 3.
Figure 6:
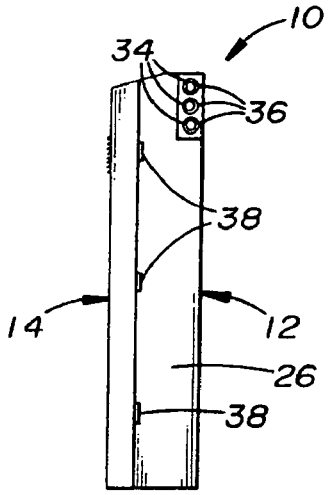
FIG. 6 is a side elevational view of a first embodiment of the enclosure box as seen along line 6-6 of FIG. 3 showing a front door having a depth of a first size.

Referring to the drawings and particularly to FIGS. 1 and 1A, there is illustrated a telecommunications enclosure box of the present invention, generally designated 10, for compactly supporting and housing various components, such as interconnect and/or cross connect type panels A, B shown in FIG. 1, providing communicative connection of remote multimedia equipment or the like. The enclosure box 10 basically includes a base 12, a front door 14, a pair of first mounting brackets 16, a pair of second mounting brackets 18, a plurality of first securing elements 20, and a plurality of second securing elements 22.

Referring now to FIGS. 1, 2, 8, 9, 12 and 13, the base 12 of the enclosure box 10 includes a back wall 24 of a generally flat configuration and a side wall 26 of an annular configuration. The side wall 26 is attached to, projects outwardly from, and surrounds the back wall 24 so as to form an interior cavity 28 therewith. The side wall 26 also forms a peripheral edge 30 defining a front opening 32 to the interior cavity 28. The side wall 26 of the base 12 has a plurality of knockouts 34 which are removable to form apertures 36 for permitting passage of cables (not shown) into and from the components A, B mounted in the interior cavity 28 of the base 12.

Figure 7:
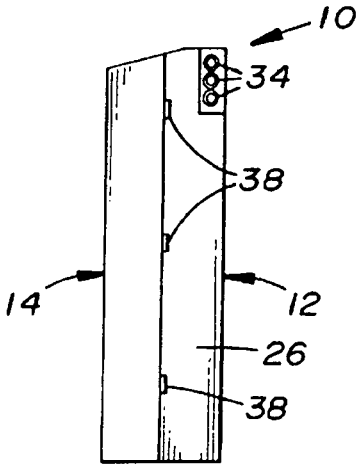
FIG. 7 is a side elevational view of a second embodiment of the enclosure box similar to that of FIG. 6 except showing a front door having a depth of a second size about twice the first size of the depth of the front door of FIG. 6.
Figure 12:
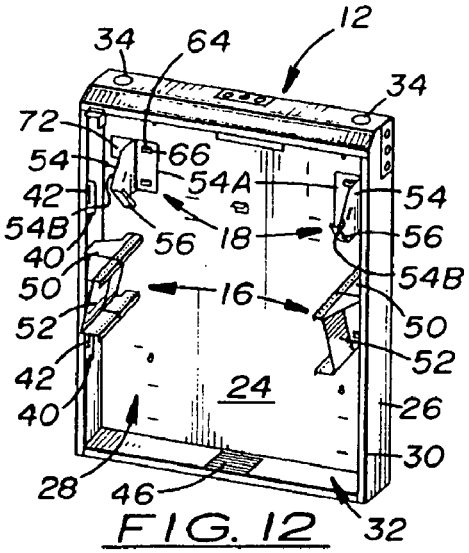
FIG. 12 is a front perspective view of the enclosure box without the front door of the larger second depth size of FIG. 7 for showing pairs of first and second mounting brackets having respective second lengths and being used with the front door of the larger second depth size.
Figure 8:
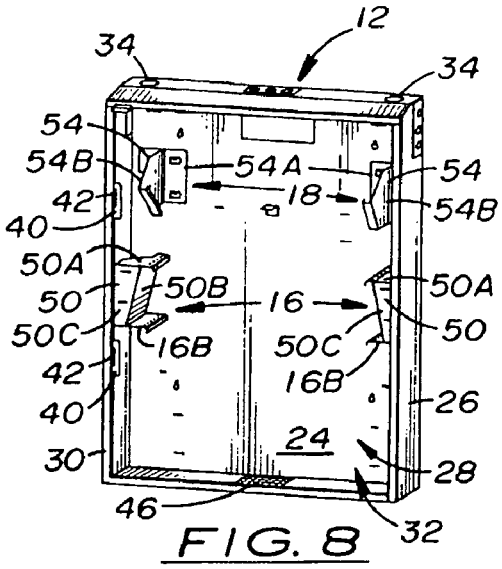
FIG. 8 is a front perspective view of the enclosure box without the front door of the smaller first depth side of FIG. 6 for showing pairs of first and second mounting brackets having first lengths and used with the front door of the smaller first depth size.

Referring to FIGS. 1A and 3 to 7, the front door 14 of the enclosure box 10 is mounted to the side wall 26 of the base 12 by hinges 38 to undergo pivotal movement toward and away from the back wall 24 of the base 12 for opening and closing the front opening 32 to the interior cavity 28 of the base 12 to thereby respectively expose and enclose the interior cavity 28 of the base 12. At portions of the side wall 26 opposite from the hinges 38 are tabs 40 with slots 42 for receiving hooks (not shown) on the door 14 to lock the door 14 against the side wall 24 and thereby maintain the front opening 32 in a closed condition. The front door 14 also has an interior chamber 44 which communicates with the interior cavity 28 of the base 12 when the door 14 is closed. In accordance with first and second embodiments of the enclosure box 10, the front door 14 preferably can have first and second sizes of depths wherein the second depth size shown in FIG. 7 is greater than, for instance about twice, the first depth size shown in FIG. 6. The base 12 and front door 14 have respective air vents 46 and the door 14 has louvres 48 providing for dissipation of heat from within the interior cavity 28 of the base 12 and interior chamber 44 of the door 14.

Figure 14:
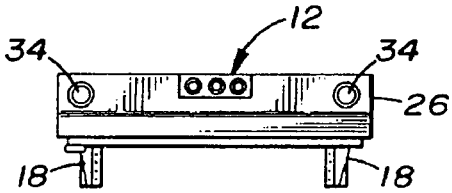
FIG. 14 is a top plan view of the enclosure box as seen along line 14-14 of FIG. 13.
Figure 10:
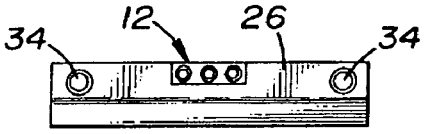
FIG. 10 is a top plan view of the enclosure box as seen along line 10-10 of FIG. 9.
Figure 13:
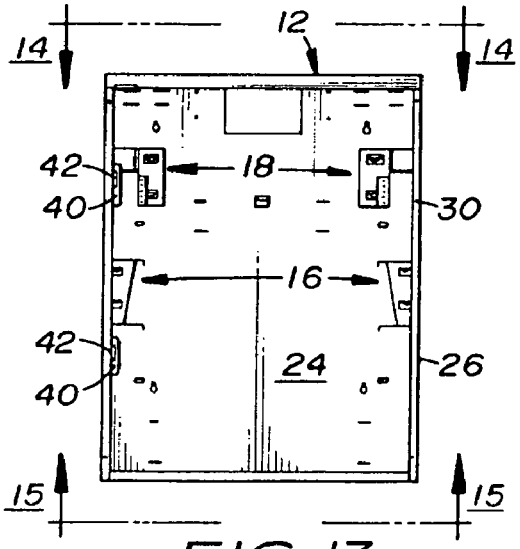
FIG. 13 is a front elevational view of the enclosure box of FIG. 12.
Figure 9:
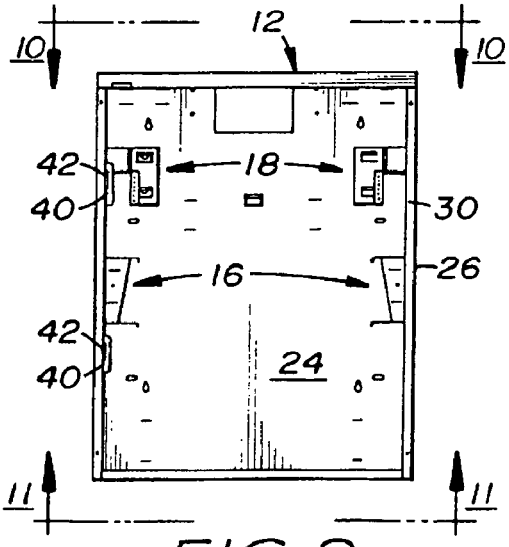
FIG. 9 is a front elevational view of the enclosure box of FIG. 8.
Figure 15:
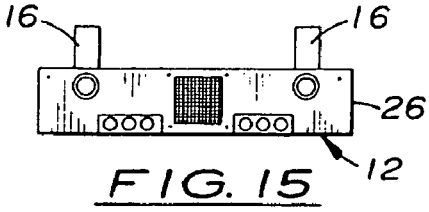
FIG. 15 is a bottom plan view of the enclosure box as seen along line 15-15 of FIG. 13.
Figure 11:
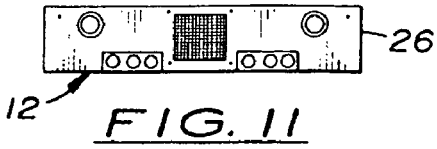
FIG. 11 is a bottom plan view of the enclosure box as seen along line 11-11 of FIG. 9.
Figure 16:
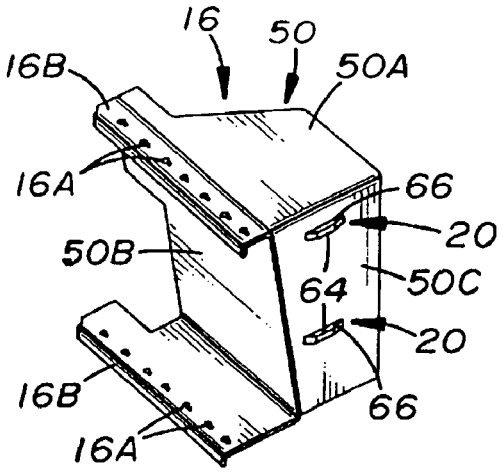
FIG. 16 is a front perspective view of a right one of a pair of first inner bracket members of the first mounting brackets mounted on the base of the enclosure box in FIGS. 1, 8, 9, 12 and 13.
Figure 17:
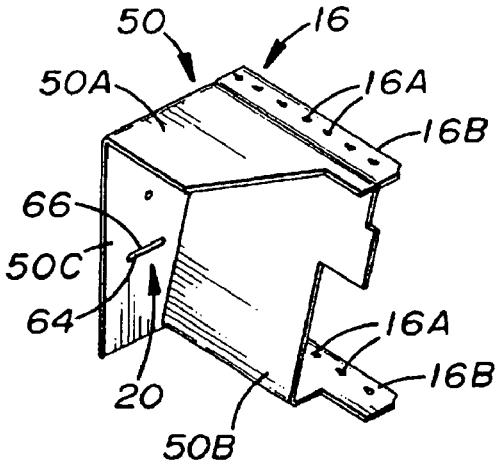
FIG. 17 is a rear perspective view of the first inner bracket member of FIG. 16.
Figure 18:
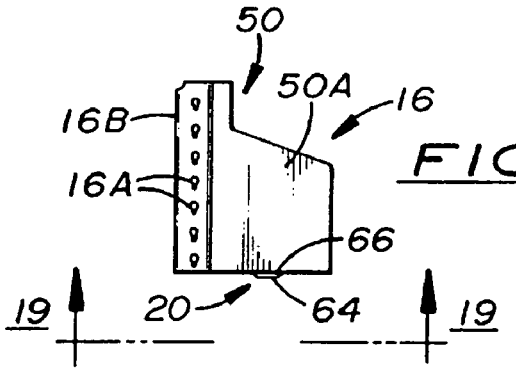
FIG. 18 is a top plan view of the first inner bracket member of FIG. 16 as seen along line 18-18 of FIG. 19.
Figure 19:
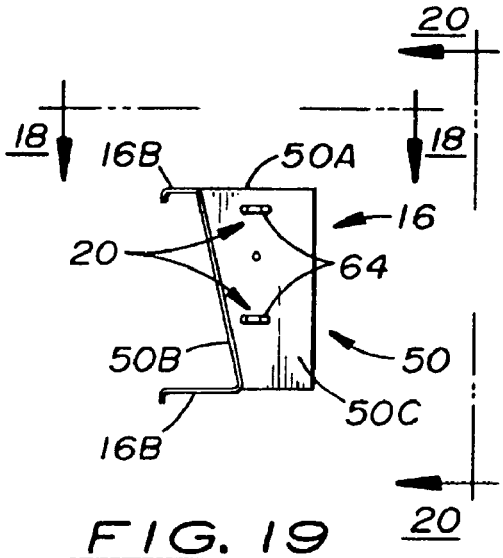
FIG. 19 is a front elevational view of the first inner bracket member as seen along line 19-19 of FIG. 18.
Figure 20:
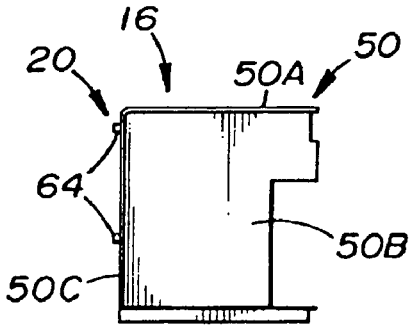
FIG. 20 is a side elevational view of the first inner bracket member as seen along line 20-20 of FIG. 19.
Figure 22:
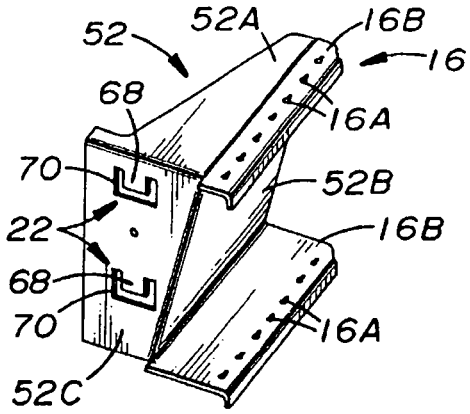
FIG. 22 is a rear perspective view of the first outer bracket member of FIG. 21.
Figure 21:
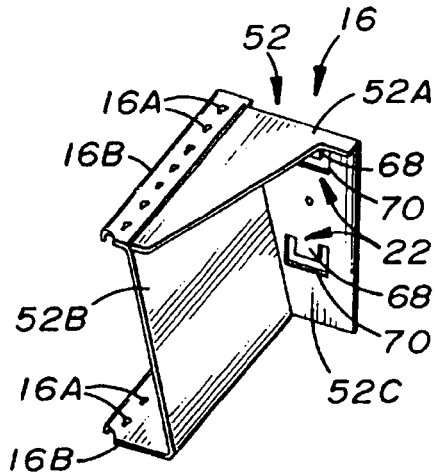
FIG. 21 is a front perspective view of a right one of a pair of first outer bracket members of the first mounting brackets which is mounted to the first inner bracket members of the first mounting brackets on the base of the enclosure box in FIGS. 12 and 13.
Figure 23:
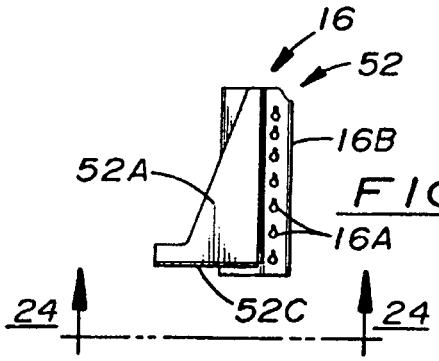
FIG. 23 is a top plan view of the first outer bracket member of FIG. 22 as seen along line 23-23 of FIG. 24.
Figure 24:
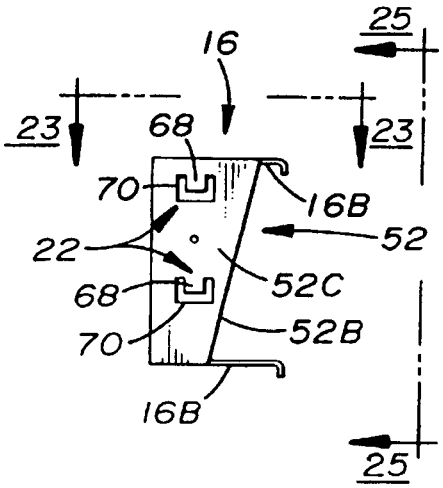
FIG. 24 is a front elevational view of the first outer bracket member as seen along line 24-24 of FIG. 23.
Figure 25:
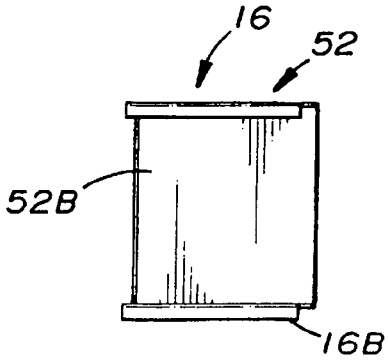
FIG. 25 is a side elevational view of the first outer bracket member as seen along line 25-25 of FIG. 24.

Referring to FIGS. 1, 8, 9, 12, 13 and 16 to 25, the pair of first mounting brackets 16 of the enclosure box 10 have means in the form of holes 16A in outer edge portions 16B of the first mounting brackets 16 for attaching with, and thereby supporting from the base 12, the insert component A for communicative connection of remote multimedia equipment or the like. The first mounting brackets 16 are fixedly attached, such as by welding, to the back wall 24 and opposite portions 26A of the side wall 26 of the base 12. The first mounting brackets 16 are substantially mirror images of one another; thus only the right one of the first mounting brackets 16 is shown in FIGS. 16 to 25 and needs to be described hereafter to understand the makeup and function of the first mounting brackets 16. Each first mounting brackets 16 can include a first inner bracket member 50 and a first outer bracket member 52. Each of the first inner and outer bracket members 50, 52 is constructed of a plurality of orthogonally arranged rigidly connected plates 50A, 50B, 50C and 52A, 52B, 52C. In the first embodiment of the enclosure box 10 where the front door 14 has the first depth size, each first mounting bracket 16 includes only the first inner bracket member 50 fixedly attached, such as by spot welding, at edges of the plates 50A, 50B to the back wall 24 of the base 12 with the plates 50A, 50B extending outwardly from the back wall 24 to give the first mounting bracket 16 a first length. In the second embodiment of the enclosure box 10 where the front door 14 has the second depth size larger than the first depth size, each first mounting bracket 16 includes both the first inner bracket member 50 and the first outer bracket member 52. The first inner bracket member 50 is fixedly attached to the back wall 24 of the base 12 as described above. The first outer bracket member 52 is mounted at the plate 52C thereof flush to the first inner bracket member 50 at the plate 50C thereof with the plates 52A and 52B of the first outer bracket member 52 forming coplanar extensions of the plates 50A and 50B of the first inner bracket member 50 now giving the first mounting bracket 16 a second length greater than the first length. The interior chamber 44 of the door 14 is adapted for receiving therein the portions of the first mounting brackets 16 that extend outwardly beyond the side wall 26 of the base 12, as seen in FIGS. 14 and 15, upon closing of the front door 14 of the second depth size against the peripheral edge 30 of the side wall 26 of the base 12.

Referring to FIGS. 1, 8, 9,12,13 and 26 to 32, the pair of second mounting brackets 18 of the enclosure box 10 have means in the form of holes 18A in outer edge portions 18B of the second mounting brackets 18 for attaching with, and thereby supporting from the base 12, the insert component B for communicative connection of remote multimedia equipment or the like. The second mounting brackets 18 are substantially mirror images of one another; thus only the right one of the second mounting brackets 18 is shown in FIGS. 26 to 32 and needs to be described hereafter to understand the makeup and function of the second mounting brackets 18. Each of second mounting brackets 18 includes a second inner bracket member 54 mounted to the back wall 24 of the base 12 and a second outer bracket member 56 mounted to the second inner bracket member 54 so as to permit the second outer bracket member 56 to undergo pivotal movement relative to the second inner bracket member 54. In the first embodiment of the enclosure box 10 where the front door 14 has the first smaller depth size, the second inner bracket member 54 of the second mounting bracket 18 has a first length. In the second embodiment of the enclosure box 10 where the front door 14 has the second larger depth size, the second inner bracket member 54 has a second length greater than the first length. In both embodiments, the second outer bracket member 56 has the same dimensions. The second inner bracket member 54 has a pair of orthogonally arranged rigidly connected plates 54A, 54B. The second outer bracket member 56 has a pair of orthogonally arranged rigidly connected plates 56A, 56B. The one plate 56A of the second outer bracket member 56 has a lower enclosed linear-shaped slot 58 and an upper open J-shaped slot 60 which receive a pair of spaced rivets 62 on the one plate 54B of the second inner bracket member 54 which mounts the second outer bracket member 56 to undergo pivotal movement relative to the second inner bracket member 54 between the full line and dashed line positions shown in FIG. 26. Such pivotal movement of the second outer bracket member 56 relative to the second inner bracket member 54 permits the connection component B to be pivotally moved to a temporary work position that accommodates and facilitates the carrying out final installation terminations thereon.

Referring to FIGS. 1, 2, 8, 9, 12 and 13, the first and second securing elements 20, 22 are respectively formed on the back wall 24 of the base 12 and the second mounting brackets 18. Each of the first securing elements 20 is complementary in configuration to a respective one of the second securing elements 22 for matable interfitting of the first securing element 20 with the second securing element 22. More particularly, each first securing element 20 includes a loop 64 having a rigid construction and formed on the back wall 24 of the base 12 and protruding outwardly from the inner surface 24A of the back wall 24 and defines a slot 66 adjacent to the loop 64. Each second securing element 22 is a tongue 68 having a rigid construction and formed on the second mounting bracket 18 by a generally U-shaped slot 70 defined therein. The rigid tongue 68 is matably interfittable through the slot 66 formed adjacent to the rigid loop 64. It can be readily understood that the respective locations of the rigid loops 64 and tongues 68 can be reversed.

With respect to the pair of first mounting brackets 16, with only the right one of the first mounting brackets 16 being shown in FIGS. 16 to 25, the rigid loop 64 of the first securing element 20 is formed on the plate 50C of the first inner bracket member 50 as shown in FIGS. 16 to 20, while the rigid tongue 68 of the second securing element 22 is formed on the plate 52C of the first outer bracket member 52 as shown in FIGS. 21 to 25. More specifically, the plate 50C of each first inner bracket member 50 has formed thereon a pair of spaced apart rigid loops 64 of the first securing elements 20 and the plate 52C of each first outer bracket member 52 has a pair of spaced apart rigid tongues 68 of the second securing elements 22 formed thereon and being aligned and interfitted with the pair of spaced apart rigid loops 64 so as to mount the first outer bracket member 52 on the first inner bracket member 50. It can be readily understood that the respective locations of the rigid loops 64 and tongues 68 can be reversed.

Figure 2:
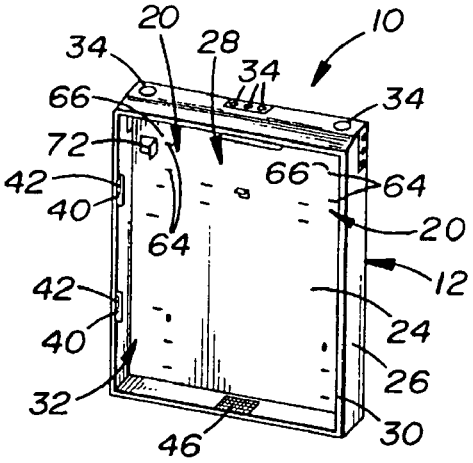
FIG. 2 is a front perspective view of the enclosure box similar to that of FIG. 1 but showing all of the connection components and mounting brackets removed from the base of the enclosure box.
Figure 27:
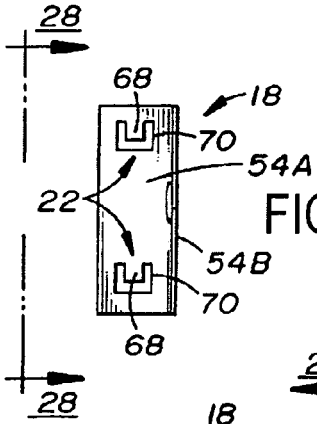
FIG. 27 is a front elevational view of the second inner bracket member of FIG. 26 as seen along line 27-27 of FIG. 28.
Figure 28:
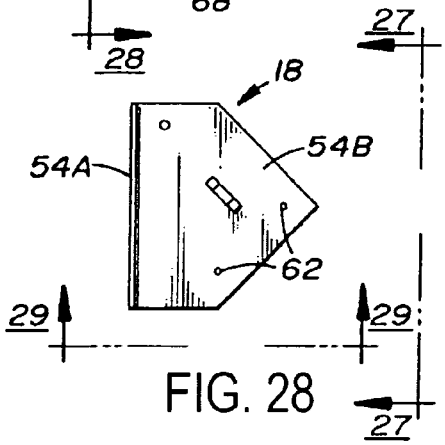
FIG. 28 is a side elevational view of the second inner bracket member as seen along line 28-28 of FIG. 27.
Figure 29:
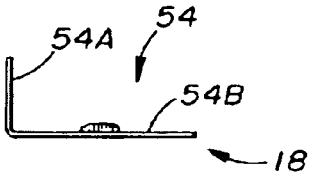
FIG. 29 is a bottom plan view of the second inner bracket member as seen along line 29-29 of FIG. 28.

With respect to the second mounting brackets 18, with only the right one of the second mounting brackets 18 being shown in FIGS. 26 to 32, the rigid loop 64 of the first securing element 20 is formed on and project into the interior cavity 28 from the back wall 24 of the base 12 as shown in FIG. 2, while the rigid tongue 68 of the second securing element 22 is formed on the plate 54B of the second inner bracket member 54 of the second mounting bracket 18 as shown in FIGS. 26 and 27. More specifically, the back wall 24 has formed thereon a pair of spaced apart rigid loops 64 of the first securing elements 20 and the plate 54A of the second inner bracket member 54 of each second mounting bracket 18 has a pair of spaced apart rigid tongues 68 of the second securing elements 22 formed thereon and aligned and interfitted with the rigid loops 64 so as to mount the second mounting brackets 18 on th back wall 24 of the base 12. It can be readily understood that the respective locations of the rigid loops 64 and tongues 68 can be reversed. Also, the back wall 24 of the base 12 has a pair of spaced apart tabs 72 cut and bend out therefrom so as to lie along, engage with, and support the second inner bracket members 54 of the respective second mounting brackets 18.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A telecommunications enclosure box for compactly supporting and housing components that provide communicative connection of remote multimedia equipment, said enclosure box comprising:

(a) a base including a back wall and a side wall connected to and surrounding said back wall so as to form an interior cavity therewith, said side wall also forming a peripheral edge defining a front opening to said interior cavity;

(b) a front door mounted to said side wall of said base so as to undergo movement toward and away from said back wall of said base for opening and closing said front opening to said interior cavity of said base to thereby respectively expose and enclose said interior cavity of said base;

(c) a pair of first mounting brackets being constructed of a plurality of orthogonally arranged rigidly connected plates having a first configuration and a pair of second mounting brackets being constructed of a plurality of orthogonally arranged connected plates having a second configuration different from said first configuration of said first mounting brackets, each of said first and second mounting brackets having attaching means for supporting various components for communicative connection of remote multimedia equipment, said pair of first mounting brackets each having a first inner bracket member being fixedly attached to said back wall of said base and extending outwardly therefrom in defining a first length of said first mounting bracket and being adapted to be removably connected to a first outer bracket member that extends outwardly from said first inner bracket member in defining a second length greater than said first length of said first mounting bracket; and (d) a plurality of first securing elements and a plurality of second securing elements, each of said first securing elements being complementary in configuration to a respective one of said second securing elements for matably interfitting of said first securing elements with said second securing elements, said first securing elements being formed on one of said back wall of said base and said second mounting bracket, said second securing elements being formed on the other of said back wall of said base and said second mounting brackets and matably interfitted with said respective first securing elements to mount said second mounting brackets on said back wall of said base.

2. The enclosure box as recited in claim 1, wherein each of said first securing elements includes a loop having a rigid construction and protruding outwardly from one of said second mounting brackets and said back wall of said base and a slot defined adjacent to said loop.

3. The enclosure box as recited in claim 2, wherein each of said second securing elements includes a tongue having a rigid construction and being formed on the other of said second mounting bracket and said back wall of said base by a generally U-shaped slot defined therein, said tongue being matably interfitted through said slot adjacent to said loop.

4. The enclosure box as recited in claim 1, wherein each of said second mounting brackets has formed thereon one of a pair of spaced apart first securing elements and a pair of spaced apart second securing elements, said back wall of said base having the other of said pair of spaced apart first securing elements and said pair of spaced apart second securing elements formed thereon and being aligned and interfitted with said one of said pair of spaced apart first securing elements and said pair of spaced apart second securing elements so as to mount said second mounting brackets on said back wall of said base.

5. The enclosure box as recited in claim 1, wherein said second mounting brackets of said pair thereof are substantially mirror images of one another.

6. The enclosure box as recited in claim 1, wherein each of said second mounting brackets includes a second inner bracket member mounted to said back wall of said box and a second outer bracket member being mounted to said second inner bracket member so as to permit said second outer bracket member to undergo pivotal movement relative to said second inner bracket member, said second outer bracket member being constructed of a pair of orthogonally arranged rigidly connected plates with one plate having a lower enclosed linear-shaped slot and an upper open J-slot for receiving a pair of spaced rivets for pivotal connection to said second inner bracket member of said second mounting brackets such that said second outer bracket member is permitted to undergo pivotal movement relative to said second inner bracket member.

7. The enclosure box as recited in claim 6, wherein said back wall of said base has a pair of spaced apart tabs cut and bent out therefrom so as to lie along and support said second inner bracket members of said respective second mounting brackets.

8. The enclosure box as recited in claim 1, wherein said first mounting brackets of said pair thereof are substantially mirror images of one another.

9. The enclosure box as recited in claim 1, wherein said front door has an interior chamber for receiving therein the portion of said first mounting bracket extending outwardly beyond said side wall of said base upon closing of said front door against said peripheral edge of said side wall of said base.

10. The enclosure box as recited in claim 1, wherein said front door has one of first and second sizes of depths wherein said second depth size is greater than said first depth size.

11. The enclosure box as recited in claim 1, wherein said side wall of said base has knockouts which are removable to form apertures for passage of cables into and from said interior cavity of said base.

12. A telecommunications enclosure box for compactly supporting and housing components that provide communicative connection of remote multimedia equipment, said enclosure box comprising:

(a) a base including a back wall and a side wall connected to and surrounding said back wall so as to form an interior cavity therewith, said side wall also forming a peripheral edge defining a front opening to said interior cavity, said side wall having knockouts which are removable to form apertures for passage of cables into and from said interior cavity of said base;

(b) a front door mounted to said side wall of said base so as to undergo movement toward and away from said back wall of said base for opening and closing said front opening to said interior cavity of said base to thereby respectively expose and enclose said interior cavity of said base;

(c) a pair of first mounting brackets being substantially mirror images of one another and being constructed of a plurality of orthogonally arranged rigidly connected plates having a first configuration and a pair of second mounting brackets being substantially mirror images of one another and being constructed of a plurality of orthogonally arranged connected plates having a second configuration different from said first configuration of said first mounting brackets, each of said first and second mounting brackets having attaching means for supporting various components for communicative connection of remote multimedia equipment, said pair of first mounting brackets being rigidly attached to said back wall and to respective opposite portions of said side wall of said base, each of said pair of second mounting brackets including a second inner bracket member mounted to said back wall of said base and a second outer bracket member mounted to said second inner bracket member so as to permit said second outer bracket member to undergo pivotal movement relative to said second inner bracket member, said back wall of said base having a pair of spaced apart tabs cut and bent out therefrom so as to lie along and support said second inner bracket members of said respective second mounting brackets; and (d) a plurality of first securing elements and a plurality of second securing elements, each of said first securing elements being complementary in configuration to a respective one of said second securing elements for matably interfitting of said first securing element with said second securing element, said first securing elements being formed on one of said back wall of said base and said second mounting bracket, said second securing elements being formed on the other of said back wall of said base and said second mounting brackets and matably interfitted with said respective first securing elements to mount said second mounting brackets on said back wall of said base.

13. The enclosure box as recited in claim 12, wherein:

each of said first securing elements includes a loop having a rigid construction and protruding outwardly from one of said second mounting bracket and said back wall of said base and a slot defined adjacent to said loop; and each of said second securing elements includes a tongue having a rigid construction and being formed on the other of said second mounting bracket and said back wall of said base by a generally U-shaped slot defined therein, said tongue being matably interfitted through said slot adjacent to said loop.

14. The enclosure box as recited in claim 12, wherein each of said first mounting brackets includes a first inner bracket member and a first outer bracket member, said first inner bracket member being fixedly attached to said back wall of said base and said first outer bracket member being mounted to said first inner bracket member.

15. The enclosure box as recited in claim 12, wherein each of said second mounting brackets having formed thereon one of a pair of spaced apart first securing elements and a pair of spaced apart second securing elements, said back wall of said base having the other of said pair of spaced apart first securing elements and said pair of spaced apart second securing elements formed thereon and being aligned and interfitted with said one of said pair of spaced apart first securing elements and said pair of spaced apart second securing elements so as to mount said second mounting brackets on said back wall of said base.

* * * * *